J. E. WHITACRE.
HUMIDIFIER.
APPLICATION FILED MAR. 12, 1919.

1,393,058.

Patented Oct. 11, 1921.

Inventor:
James E. Whitacre
By Ira J. Wilson.
Atty.

UNITED STATES PATENT OFFICE.

JAMES E. WHITACRE, OF ROCKFORD, ILLINOIS.

HUMIDIFIER.

1,393,058.  Specification of Letters Patent.  Patented Oct. 11, 1921.

Application filed March 12, 1919. Serial No. 282,248.

*To all whom it may concern:*

Be it known that I, JAMES E. WHITACRE, a citizen of the United States, residing at Rockford, in the county of Winnebago and State of Illinois, have invented certain new and useful Improvements in Humidifiers, of which the following is a specification.

This invention pertains in general to air moistening or humidifying, and while applicable wherever it is desired to increase the humidity it has been especially designed for use in connection with heating systems of various descriptions. It should be understood, however, that my invention contemplates broadly the humidifying of air regardless of the particular ventilating or heating system with which it might be used.

It is well recognized that air when too dry is inimical to healthy living conditions, and while various steps have been taken to moisten the air by means of sprays and water pans, especially in connection with heating systems for private dwellings, there has never been provided, so far as I am aware, means for regulating the humidity and automatically maintaining it.

The primary object of the present invention is to provide a regulable means for humidifying the air and for automatically maintaining it at a predetermined relative humidity. That is, with my improvements the relative humidity best suited to insure the maintenance of hygienic living conditions in private dwellings, hospitals and public buildings, and other places, may be properly regulated. This is accomplished by an automatically governed air-moistening device which will be presently described.

I have also aimed to provide a construction by means of which dust and other impurities will be removed from the incoming air.

Another object of my invention is to provide an air-moistening device or humidifier of the character described which shall be of such simple and practical construction as to be capable of production at a comparatively low cost.

A still further object is to provide a humidifier of novel construction, the elements of which serve to accomplish the desired objects in a thoroughly practical and satisfactory manner.

Other objects and attendant advantages will be appreciated as the invention becomes better understood by reference to the following description when considered in connection with the accompanying drawings, in which—

Figure 1:
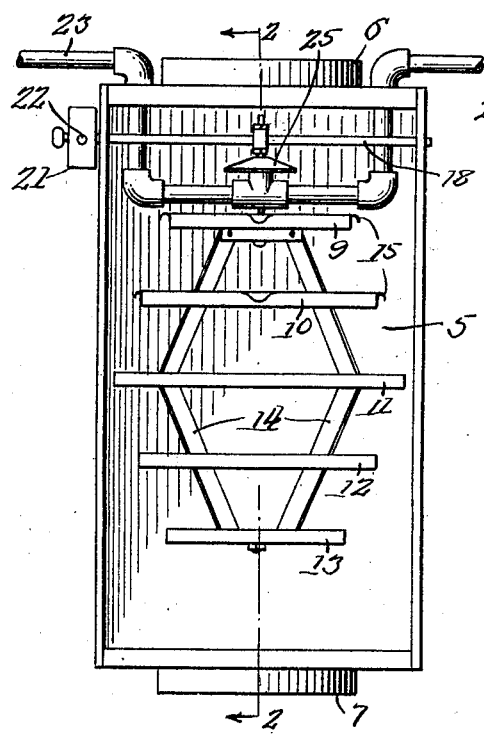
Figure 2:
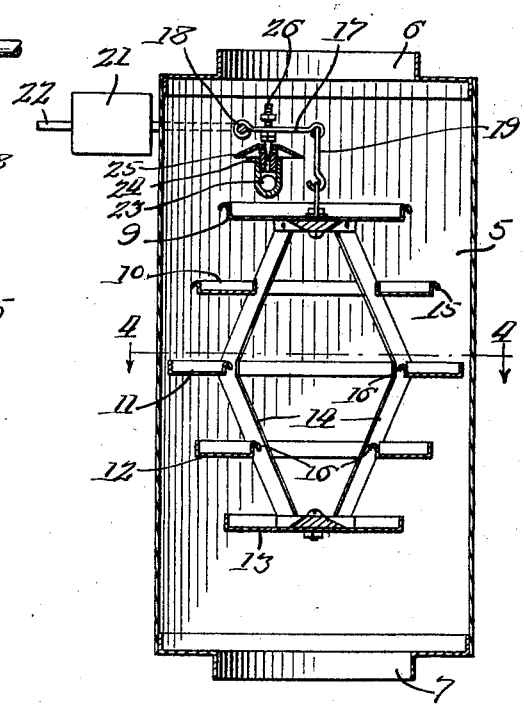
Figure 3:
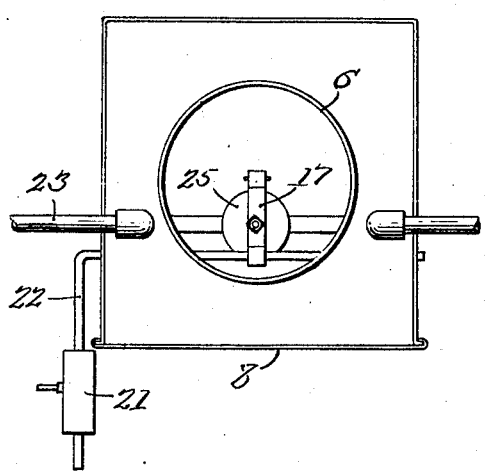

Figure 1 is a front view of a humidifier embodying my improvements with wall 8 removed;

Fig. 2, a vertical sectional view taken substantially on the line 2—2 of Fig. 1;

Fig. 3, a plan view of the device; and

Figure 4:
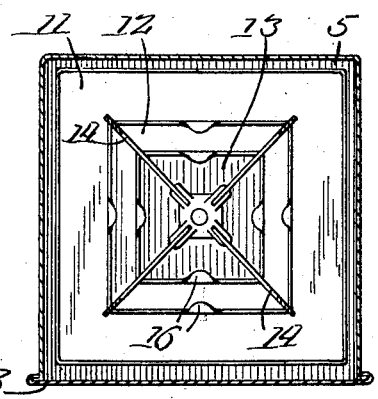

Fig. 4, a sectional view taken substantially on the line 4—4 of Fig. 2.

This particular illustration of my improvements I have taken as an example, in connection with the fresh air conduit or inlet of a hot air heating system, although it should be understood that my improvements contemplate the moistening of air in connection with any heating or ventilating system. And in such various adaptations the size, shape and proportions of the parts for effecting the objects in mind would be properly suited to the conditions at hand.

In the present case, the inlet air conduit designated generally by character 5, has an upper inlet 6 and a lower outlet 7. The inlet and outlet ends are preferably round so as to register with the pipe connections of an ordinary hot air system; and the intermediate conduit 5 which houses the air-moistening device, has an enlarged cross-sectional area so as not to restrict the air passage. I also prefer that the conduit 5 shall be accessible through means of a suitable closure, such for example as a front wall 8 which may be slid up or down on the casing to an open position; or, if desired, this cover wall might be hinged.

Within the conduit 5, I support a series of relatively shallow water containers so arranged that the air in passing down through the conduit will follow a somewhat circuitous course so as to pick up as much moisture as possible; and by varying the surface area thus exposed for evaporation, I change the relative humidity or degree of saturation of the atmosphere. In the present case, a series of water containers constituting a unit are so arranged in vertically spaced relation that each lower container is supplied by overflow from the next above, and the uppermost container is supplied from an automatically controlled valve. The water containers designated by characters 9 to 13 inclusive, are relatively shallow and held in vertically spaced relation by a suitable framework 14. The top and bottom containers 9 and 13 respectively are square and have a solid center, while the intermediate containers are also square but have hollow centers so as to allow circulation of air therethrough. The marginal edges of the containers 9 and 10 are provided with small lips or spouts 15, for guiding the overflow to the next lower container, and for the same purpose the containers 11 and 12 are provided at their inner sides with lips or spouts 15.

My invention contemplates supporting the container in such manner that it is capable of vertical movement within the air conduit for the purpose of actuating a valve and thereby governing the supply of water. It also contemplates the actuation of this valve by reason of a change in the quantity of water due to evaporation. To this end I have pivotally suspended the container from the end of a lever 17, which in turn is fixed to a horizontal rock shaft 18 suitably mounted on the casing. This suspension or support of the container may be effected in various ways, and it is desired that the container shall be easily removable for purpose of cleaning. In the present case, this is done by removing the container from the hooked link 19. Means is now provided for counterbalancing the container, and in the present instance I have employed a weight 21 adjustable inwardly and outwardly on the arm 22 of the shaft 18. I have aimed to supply water to the container until a given surface area is presented for evaporation, and to then automatically shut off the supply. That is, all of the containers or a given number, will be successively filled until a given quantity of water has been supplied. The weight of the water will then cause the container to drop and shut off the water supply. In this case, the water supplied through a pipe 23 is adapted to be delivered through opening 24 and deflected downwardly by a baffle 25 into the top container 9. A needle valve 26 adapted to close the opening 24 passes through the lever 17 and is equipped with suitable adjusting nuts above and below the lever for regulating the valve action.

When the container is empty it will be held in an elevated position by the weight 21, thus permitting the needle valve to rise. Since the pipe 23 is connected to the city main or to any other source of supply, the water will be delivered through the opening 24 to the top container 9. When this container is filled the water will overflow to the container 10 and thence to the next lower container 11, and so on. The weight 21 is positioned at such distance from the shaft 18 as to be overcome by the weight of the water and container when a given quantity of water has been supplied. In other words, the water will be automatically shut off at a predetermined time with relation to the quantity of water supplied. Thus, the device may be so regulated that the valve will be closed when any given number of containers or all, have been filled. In the event that a high relative humidity is desired, the device will be adjusted to fill all the containers, thus presenting the greatest area for evaporation. When a lower humidity is desired it will be obvious that less surface area will be exposed and this will be regulated by adjustment of the weight 21 to cause the valve to be shut off when the proper quantity of water has been supplied. The air passing downwardly through the conduit 5 must take a circuitous course imposed by arranging the containers so that they constitute baffles, thus causing the air to be saturated to a greater or less extent according to the water surface area presented. As the water evaporates, the container unit will be overbalanced by the weight 21, thus raising the needle valve and allowing the containers to be replenished to the extent desired. Thus the matter of maintaining a given surface area of water for purpose of evaporation is automatically effected and requires no attention or manual operation for replenishing the containers or water pans, as is necessary with the ordinary constructions now in use. In addition to this automatic action, the humidity may be increased or diminished by exposing greater or less surface area for evaporation. This is especially desirable, because it enables regulation of the humidity to a nicety, as it is found that under various conditions of usage and different temperatures the humidity must, in order to secure the most satisfactory conditions, be accordingly regulated to suit the requirements. It will also be noted that the water containers by reason of their interposition in the incoming air conduit, serve to collect the dust and other foreign particles from the air. To this end, the containers are especially effective, due to their arrangement, causing the air to travel in a circuitous path over the several containers. Thus the air is purified considerably and rendered more fit for healthy living conditions.

It is believed that the foregoing conveys a clear understanding of my improvements and of the objects prefaced above, and while I have illustrated but a single working embodiment thereof, it will be evident that various changes might be made in the construction and arrangement without departing from the spirit and scope of the invention as expressed in the appended claims; in which—

I claim:

1. The combination of a conduit down through which the air passes, a series of relatively shallow water containers in vertically spaced relation in said conduit, each container having a different surface area for evaporation and adapted to be supplied with water by overflow from the container next above, said containers constituting a unit mounted with capacity for vertical movement within the conduit, and a valve for supplying water to the uppermost container and being actuated by vertical movement of the container unit.

2. A humidifier comprising an inlet air conduit down through which the air passes, a series of relatively shallow water containers within the conduit, each container having a different surface area for evaporation, means for supplying water to said containers, and means for automatically shutting off said supply when a predetermined quantity of water has been delivered to the containers and for replenishing the containers when said quantity through evaporation is lowered.

3. A humidifier of the character described comprising an air inlet conduit down through which the air passes, a series of superposed shallow water containers having different surface areas within the conduit constituting a unit, means supporting said unit with capacity for vertical movement, means for supplying water to the uppermost container, the containers being so constructed that each lower container is supplied with water by overflow from the container next above, means counterbalancing the weight of said unit, and a valve in the water supply actuated by vertical movement of said unit for automatically supplying water thereto in accordance with the quantity of water exposed for evaporation in said shallow containers.

JAMES E. WHITACRE.